MECHANISM FOR FOLDING DOCUMENTS OVER THE EDGE OF CARDS

Filed Nov. 30, 1949 6 Sheets-Sheet 1

INVENTORS
GUSTAV V. A. MALMROS
EDMUND A. BARBER, JR.

Ralph C. Dustin
ATTORNEY

MECHANISM FOR FOLDING DOCUMENTS OVER THE EDGE OF CARDS

INVENTORS
GUSTAV V. A. MALMROS
EDMUND A. BARBER, JR.
Ralph C. Dustin
ATTORNEY

Feb. 10, 1953 G. V. A. MALMROS ET AL 2,628,092

MECHANISM FOR FOLDING DOCUMENTS OVER THE EDGE OF CARDS

Filed Nov. 30, 1949 6 Sheets-Sheet 3

INVENTORS
GUSTAV V. A. MALMROS
EDMUND A. BARBER, JR.

Ralph C. Dustin
ATTORNEY

Feb. 10, 1953 G. V. A. MALMROS ET AL 2,628,092

MECHANISM FOR FOLDING DOCUMENTS OVER THE EDGE OF CARDS

Filed Nov. 30, 1949 6 Sheets-Sheet 4

INVENTORS
GUSTAV V. A. MALMROS
EDMUND A. BARBER, JR.

Ralph C. Dustin
ATTORNEY

MECHANISM FOR FOLDING DOCUMENTS OVER THE EDGE OF CARDS

Filed Nov. 30, 1949 6 Sheets-Sheet 5

INVENTORS
GUSTAV V. A. MALMROS
EDMUND A. BARBER, JR.

Ralph C. Dustin
ATTORNEY

MECHANISM FOR FOLDING DOCUMENTS OVER THE EDGE OF CARDS

INVENTORS
GUSTAV V. A. MALMROS
EDMUND A. BARBER, JR.
Ralph C. Dustin
ATTORNEY

Patented Feb. 10, 1953 2,628,092

UNITED STATES PATENT OFFICE 2,628,092

MECHANISM FOR FOLDING DOCUMENTS OVER THE EDGE OF CARDS

Gustav V. A. Malmros, Binghamton, and Edmund A. Barber, Jr., Johnson City, N. Y., assignors to International Business Machines Corporation, New York, N. Y., a corporation of New York Application November 30, 1949, Serial No. 130,322

15 Claims. (Cl. 270—45)

This invention relates to mechanisms for attaching a source document to a corresponding record card, and more particularly to mechanisms for folding a document about a perforated card which acts as a vehicle for transporting the document through a sorting machine.

In order that source documents, such as bank checks, drafts, receipts, sales slips, bills of lading, etc., having no common size, shape, thickness or stock weight, may be successfully handled by sorting machines, each document is sometimes folded about a card in such a manner that a perforated portion of the card is exposed for determining the operation of the sorting machine. An operator first punches the card according to data on the document which is to determine the manner of sorting, and then the document is folded over the leading edge of the card so that they are effectively secured for sorting purposes. By arranging a mechanism which receives the card from a punching machine and operates automatically to fold the document about it, a rapid and efficient handling of the card and document may be obtained.

An object of this invention is to provide an improved mechanism for attaching a document to a record card.

Another object is to provide an improved mechanism which is adapted to receive a card from a punching machine and then operate automatically to fold a document over one edge of the card.

Yet another object is to provide a mechanism having a carriage which is adapted to receive a card from a punching machine and which is operable automatically upon the placing of a document in a pocket adjacent the carriage to move the card against the document so that they pass between feed rolls to effect a folding of the document over the edge of the card.

Other objects of the invention will be pointed out in the following description and claims and illustrated in the accompanying drawings, which disclose, by way of example, the principle of the invention and the best mode, which has been contemplated, of applying that principle.

In the accompanying drawings in which there is shown, for purposes of illustration, one form which the invention may assume in practice:

Figure 1:
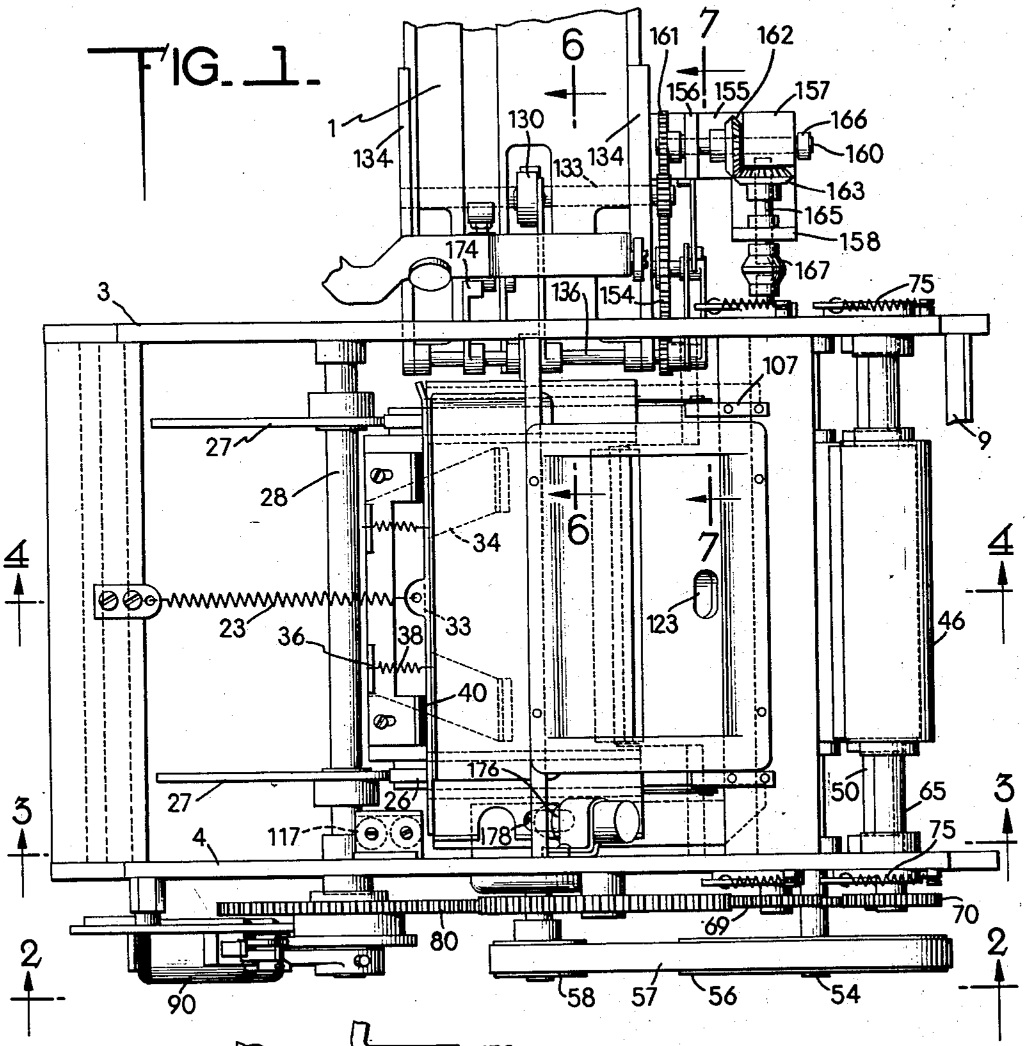
Fig. 1 is a plan view of the improved mechanism for folding a document over the edge of a card.
Figure 3:
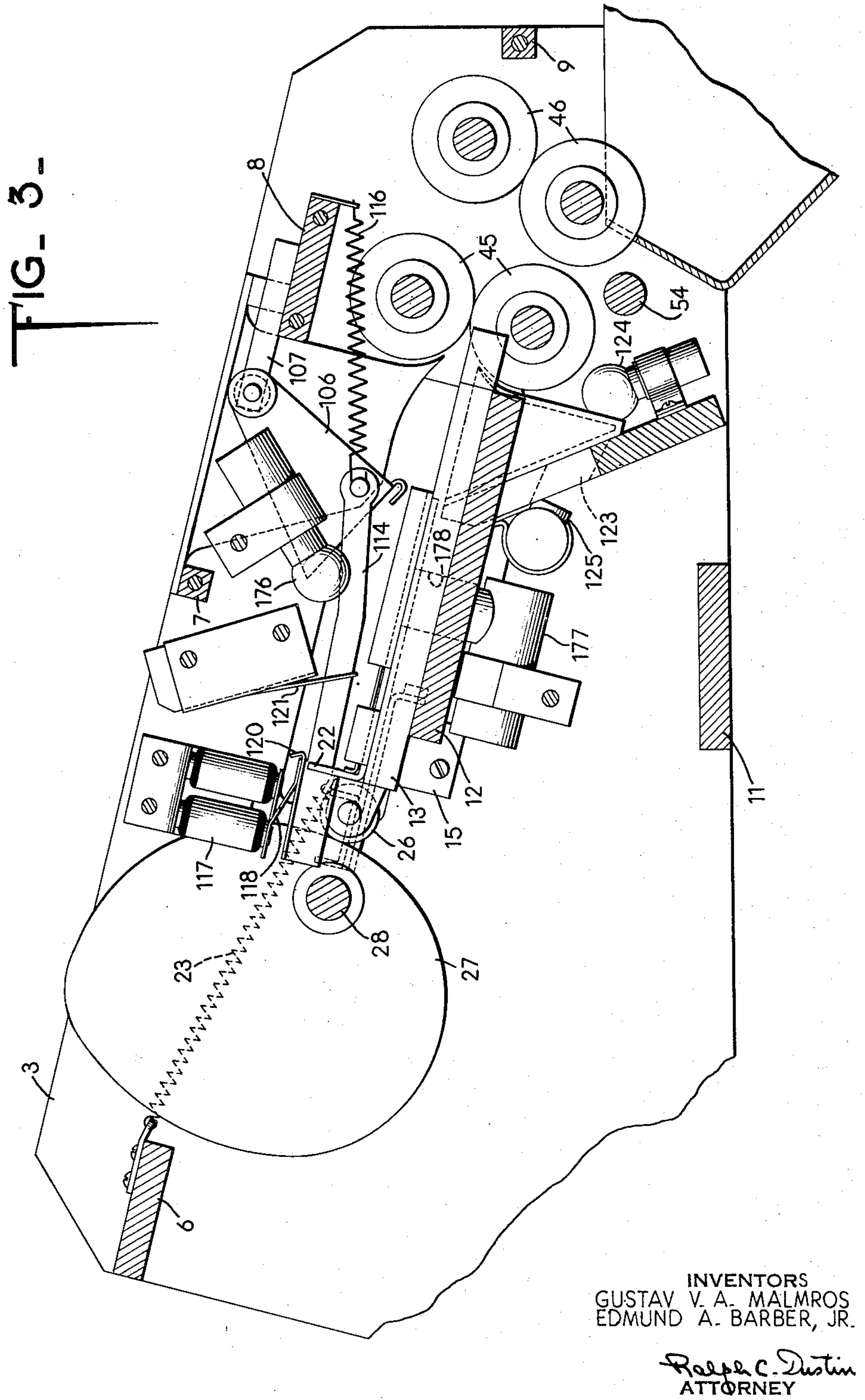
Figure 4:
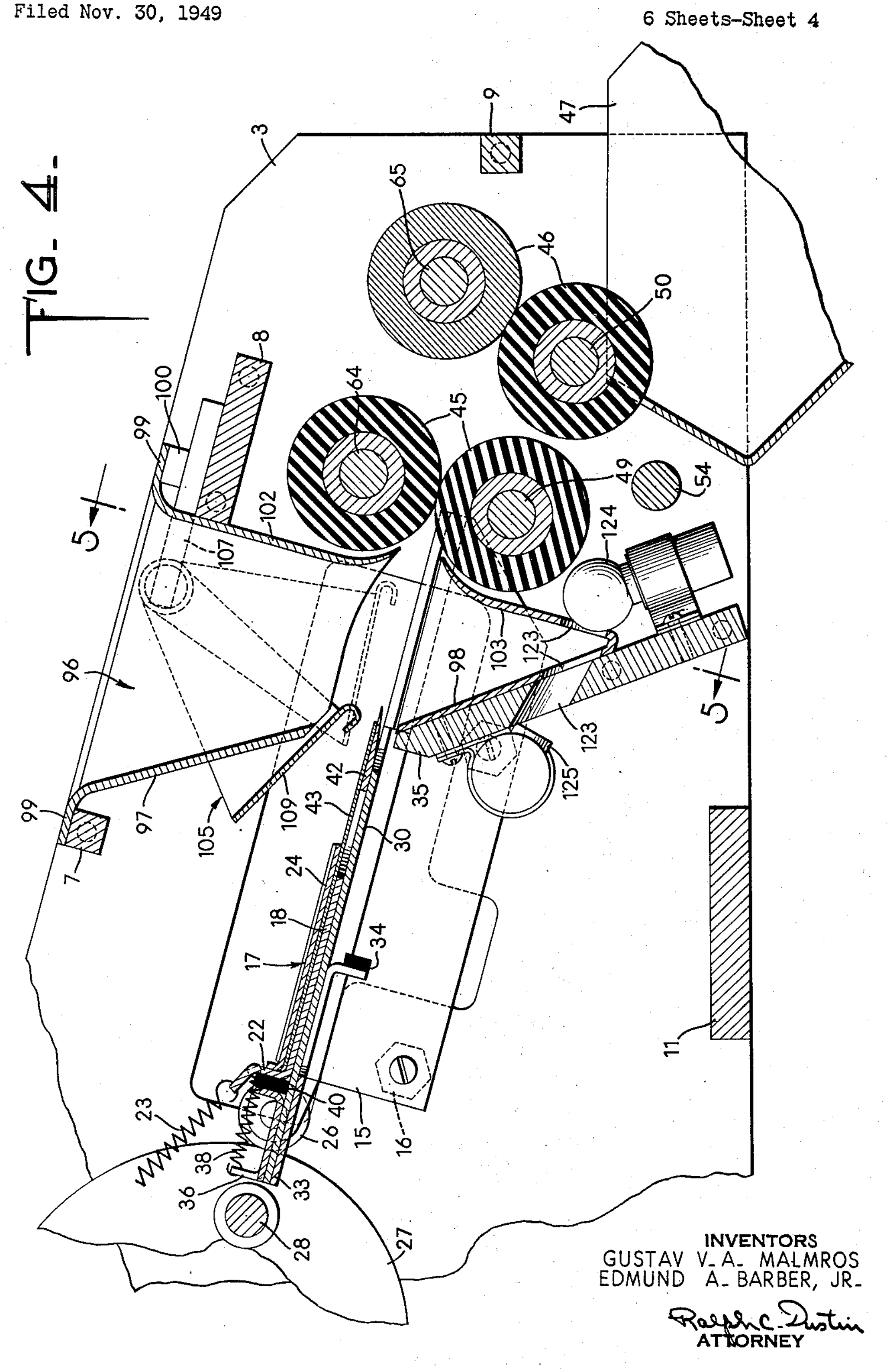

Figs. 3 and 4 are enlarged vertical sectional views taken on the planes of the lines 3—3 and 4—4 of Fig. 1.

Figure 5:
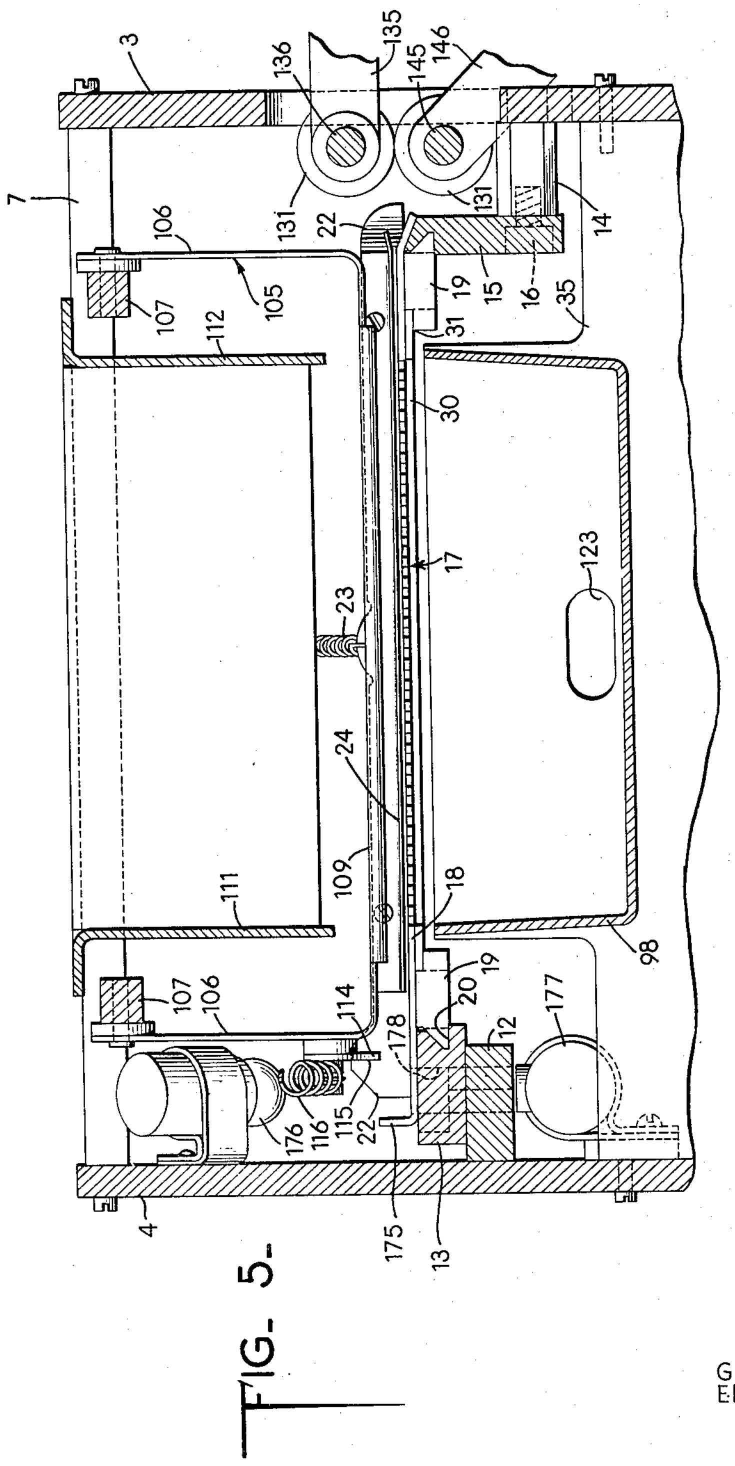

Fig. 5 is a sectional view taken on the plane of the line 5—5 of Fig. 4 to show the gate structure and the supporting means for the card carriage.

Figure 6:
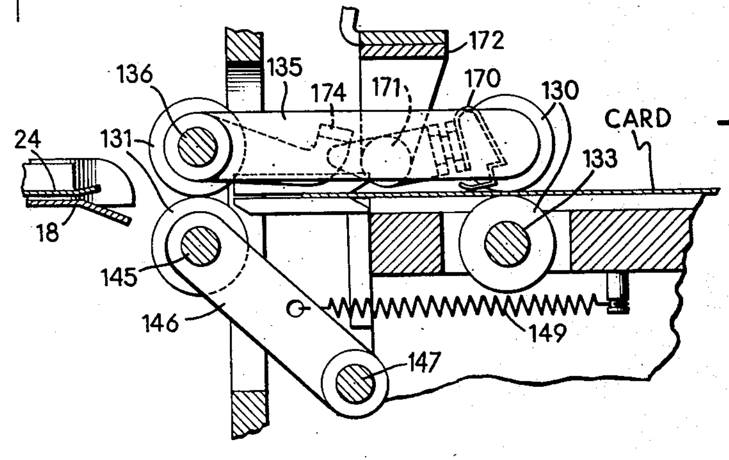
Figures 7, 8:
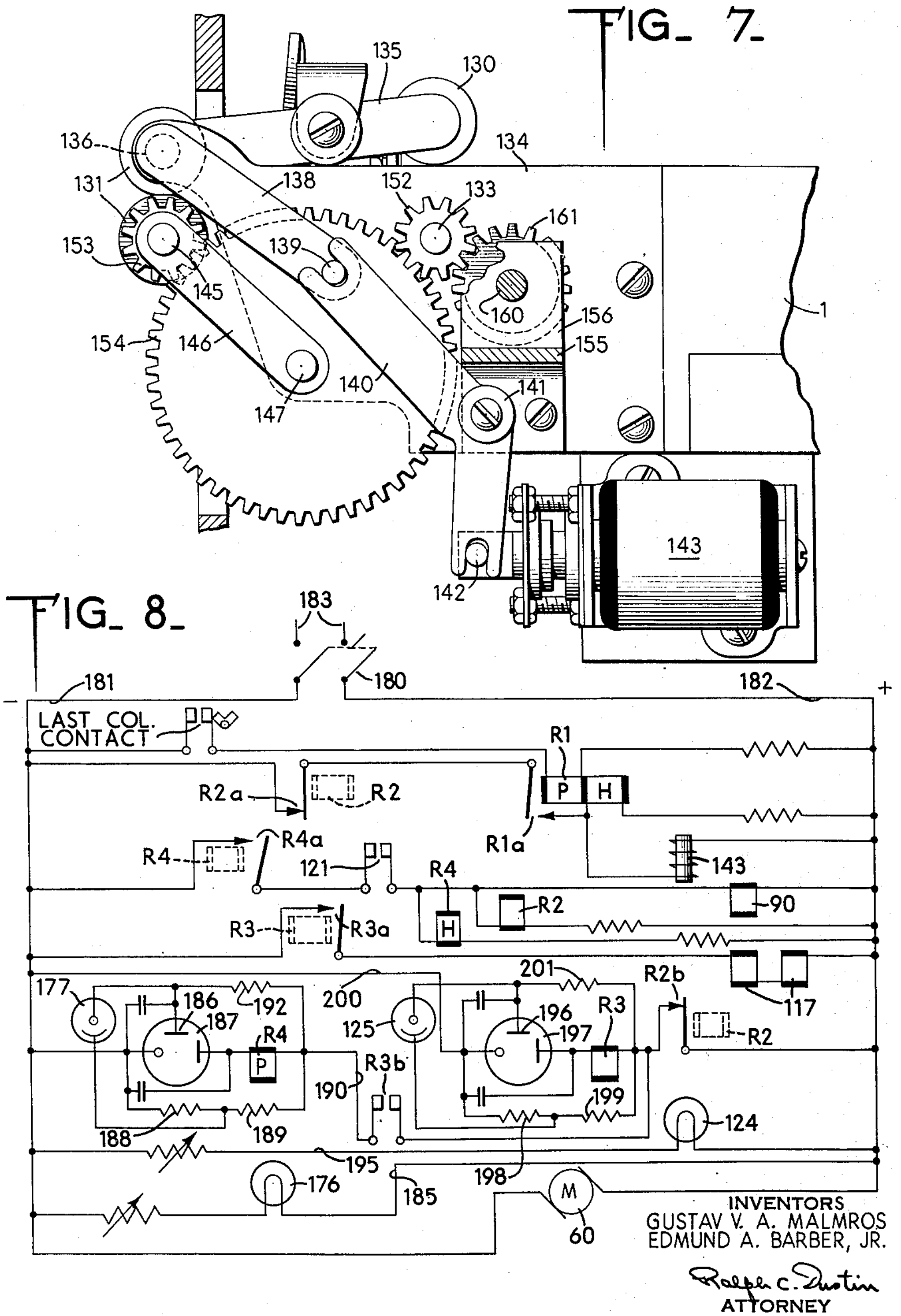

Figs. 6 and 7 are enlarged vertical sectional views taken on the planes of the lines 6—6 and 7—7 of Fig. 1 to show the mechanism for feeding cards to the card carriage of the document folding mechanism.

Fig. 8 is a wiring diagram showing the control system for the improved mechanism.

Figure 2:
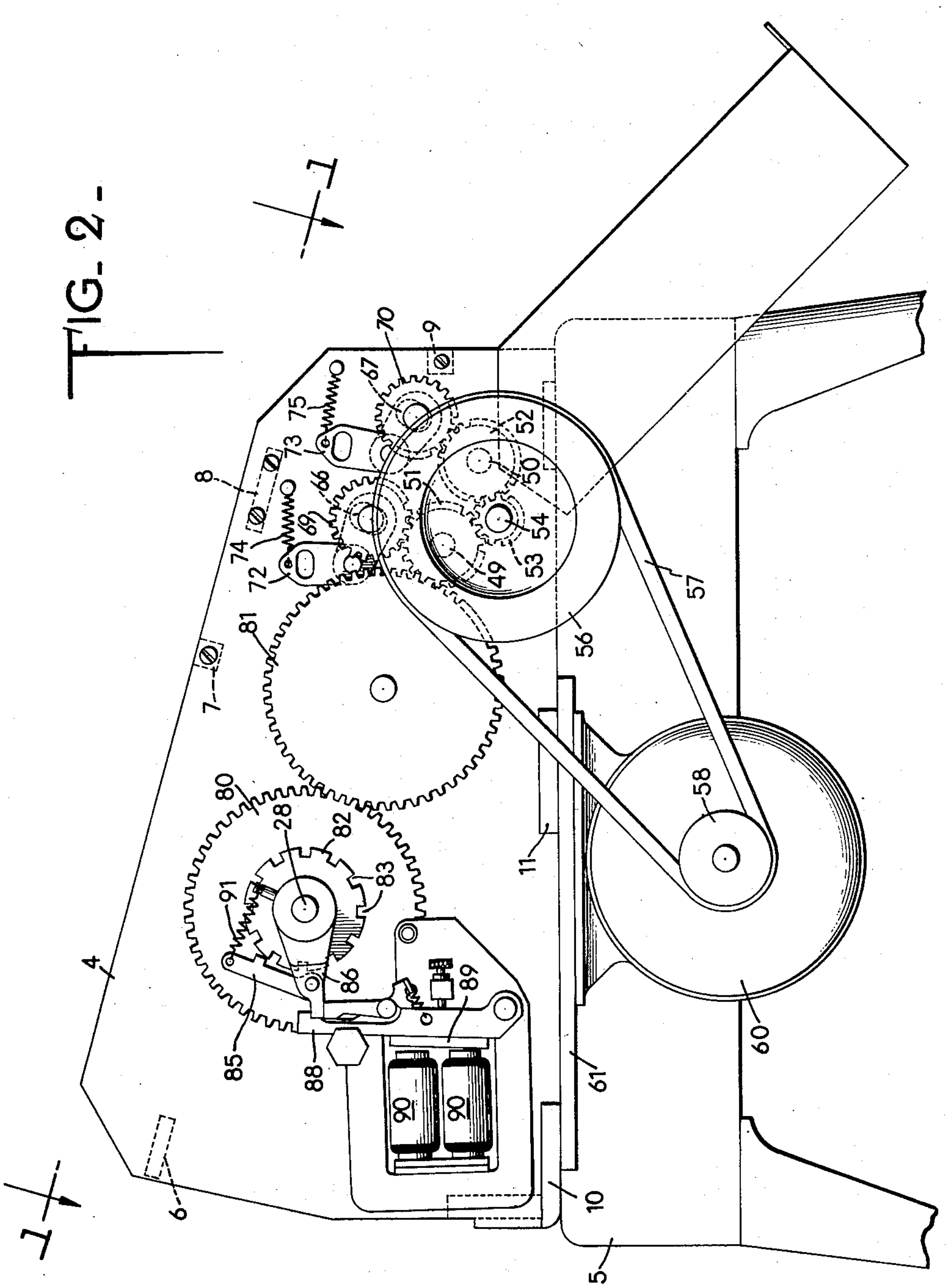
Fig. 2 is a side elevational view taken on the plane of the line 2—2 of Fig. 1.

As shown in Fig. 1, the improved mechanism for folding documents over one edge of cards is associated with a card punching machine, a portion of which is shown at 1. The document folding mechanism comprises vertical side plates 3 and 4 supported in positions extending transversely of the punching machine at the discharge end of the latter by bars 10 and 11 fastened to base 5 (Fig. 2), and these plates are connected together by tie bars 6, 7, 8 and 9. Fixed to the side plate 4 (see Fig. 5) is a support 12 having a guide member 13 attached thereto by suitable means (not shown). Projecting inwardly from the plate 3 are studs 14 having a guide member 15 connected to their inner ends, as by screws 16. Slidably supported by the guide members is a card carriage, generally designated 17, to which cards may be fed by a feeding mechanism shortly to be described.

The card carriage comprises a card-carrying plate 18 having slides 19 fixed to its lower surface and reciprocably received in grooves 20 formed in the guide members 13 and 15. As shown in Figs. 3 and 4, the plate 18 has a portion 22 at its left-hand edge bent upwardly and connected by a spring 23 to the tie bar 6. A card retainer plate 24 is connected to the portion 22 so that it is supported in a position above the plate 18 a sufficient distance to permit a card to be moved easily between them and yet provide a clearance which is small enough so that the normal curl of the card is sufficient to effect its engagement with the adjacent surfaces of the plates for holding it in place. Rotatably supported by the slides 19 at their left-hand ends are rollers 26 which are yieldingly held by the spring 23 in engagement with cams 27 fixed to a shaft 28 that is journaled at its ends in the side plates 3 and 4. Arranged beneath the plate 18 is a plate 30 which is slidably supported at its edges in grooves 31 formed in the inner edges of the slides 19. Attached to the lower side of the plate 30 is a bracket 33 having spaced abutment portions 34 which are engageable with a stop bar 35 connected at its ends to the side plates 3 and 4. At the left-hand edge of the plate 30 (Figs. 1 and 4) are upwardly bent portions 36 which are connected by springs 38 to the upwardly bent portion 22 of the plate 18 for holding the plate 30 normally in a position in which abutment members 40 carried by it engage the portion 22 of the plate 18. Fixed to the plate 30 at its right-hand edge is a deflecting blade 42 lying in the plane of the plate 18 and normally spaced from the latter so that relative movement may take place between them. A card 43 positioned between the plates 18 and 24 extends from their right-hand edges and overlies a portion of the blade 42, as indicated in Fig. 4.

At the right-hand side of the card carriage is a pair of feed rolls 45 which are adapted to receive a card from the carriage and conduct it to a second pair of feed rolls 46 which discharge it to a stacker box 47. The lower feed rolls 45 and 46 are mounted upon shafts 49 and 50 journaled in the side plates 3 and 4, and connected to one end of these shafts are gears 51 and 52 (Fig. 2) meshing with a gear 53 fixed to a shaft 54 which is journaled in the plates 3 and 4. A pulley 56 is also connected to the shaft 54 and is adapted to be driven by a belt 57 extending about a pulley 58 on the power shaft of a motor 60 which is supported by a plate 61 attached by suitable means to the bars 10 and 11. The upper feed rolls are mounted upon shafts 64 and 65 extending through openings 66 and 67 (Fig. 2) in the side plates 3 and 4, and connected to one end of these shafts are gears 69 and 70 meshing with the gears 51 and 52, respectively. The ends of the shafts 64 and 65 adjacent the gears 69 and 70 are rotatably supported by arms of bell cranks 72 and 73 pivotally mounted upon the side plate 4, and springs 74 and 75 tend to swing the bell cranks in a clockwise direction for holding the upper feed rolls in yielding engagement with the lower feed rolls. The opposite ends of the shafts 64 and 65 are supported in a similar manner by arms of bell cranks pivotally mounted upon the side plate 3 and yieldingly urged by springs in a direction to hold the upper feed rolls in engagement with the lower feed rolls.

For driving the cams 27 so as to effect a reciprocation of the card carriage 17, a gear 80 is loosely mounted upon the shaft 28 and is driven from the gear 51 through an idler gear 81. A clutch plate 82 is fixed to rotate with the gear 80 and is provided with notches 83 which are adapted to receive a dog 85 pivotally mounted upon an arm 86 fixed to the shaft 28. A latch 88 is fixed to the armature 89 of a magnet 90 and is adapted to engage the outer end of the arm 86 and a projecting portion of the dog 85 for holding the shaft 28 in a predetermined position with the dog 85 disengaged from the notches 83. A spring 91 is connected to the dog 85 for urging it in a direction to engage one of the notches 83 when the latch 88 is released by an energizing of the magnet 90.

Between the card carriage 17 and the feed rolls 45 is a pocket 96 (Fig. 4) in which documents may be supported in positions perpendicular to the plane of the card-carrying plate 18. This pocket is formed by an upper casing member 97 and a lower casing member 98, these casing members being spaced from each other so that the card carriage may pass between them toward the feed rolls 45. A flange 99 at the upper end of the casing member 97 is attached by suitable means to the tie bar 7 and to blocks 100 carried by the tie bar 8, and the casing member 98 is supported by the stop bar 35. As the card carriage is moved toward the feed rolls when a document is in the pocket 96, the blade 42 first engages the document and starts folding it while moving it between the adjacent ends of the front walls 102 and 103 of the casing members. These front walls are curved at their adjacent ends, as shown, so as to obtain smooth surfaces over which the document may slide as it is forced toward the feed rolls. The abutment portions 34 engage the bar 35 to stop the forward movement of the blade 42 just before the document is forced into engagement with the feed rolls 45. The card carriage continues to move toward the feed rolls, however, and forces the edge of the card against the document so that it is moved with the card to a point where the rolls 45 pick them up and complete the folding of the document over the edge of the card.

In order to prevent the card carriage and the blade 42 from moving forwardly while the operator's hand may be in a position to be injured by the blade, there is provided a gate 105 (Figs. 3, 4 and 5) including arms 106 pivotally supported by blocks 107 attached to the tie bar 8, and a plate portion 109 joining the lower ends of the arms. The arms 106 lie outside of the end walls 111 and 112 of the upper casing member 97, and the plate portion 109 moves under the open lower end of this casing member when the gate is swung forwardly. Pivotally connected to one of the arms 106, as shown in Figs. 3 and 5, is a bar 114 which extends through a notch 115 in the upturned portion 22 of the plate 18 and has a shoulder engageable with the left-hand side of the portion 22 for holding the gate 105 in its retracted position against the action of a spring 116. Located above the left-hand end of the bar 114 when the latter is in its latched position is an electromagnet 117 attached to the side plate 4 and operable when energized to lift the bar for unlatching it and permitting the gate 105 to be swung forwardly by the spring 116. A flexible member 118 is connected to the magnet 117 and slidably engages the bar 114 in all its positions for urging it toward the card carriage. Connected to the bar 114 is an upwardly projecting member 120 which is operable to close the contacts of a normally open switch 121 when the gate is moved to its fully closed position. The switch 121 is connected, as will be described later, in a circuit with the magnet 90 so that the clutch mechanism cannot be operated to effect forward movement of the card carriage until the gate is closed. As the carriage moves toward the feed rolls, the upturned portion 22 passes beyond the shoulder on the bar 114 so that the bar relatches and is returned with the carriage to open the gate 105.

Near the lower end of the pocket 96, as shown in Fig. 4, are aligned openings 123 extending through the front and rear walls of the lower casing member 98 and the stop bar 35. Supported by the bar 35 in line with the openings 123 at the forward side of the casing member is a light 124, and a photocell 125 is supported by the bar 35 in line with the openings at the opposite side of the casing member. When a document is placed properly in the pocket 96, the light beam through the openings 123 is cut and the photocell 125 operates, as will be described later, to energize the magnet 117.

The cards are fed to the carriage 17, as shown in Figs. 1, 6 and 7, by a mechanism including a pair of feed rolls 130 which pick up each card after punching is completed and advance it to a second pair of feed rolls 131 which discharge it to the carriage between the plates 18 and 24. The card punching machine may be like that disclosed in a patent application of G V. A. Malmros et al., Serial No. 95,934, filed May 28, 1949, and the mechanism for feeding the cards from the punching machine to the carriage is similar to that disclosed in a patent application of E. A. Barber, Jr., Serial No. 95,936, filed May 28, 1949. The lower feed roll 130 is connected to a shaft 133 journaled in plates 134 connected to the base of the punching machine 1, and the upper feed roll 130 is rotatably supported by an arm 135 connected to a shaft 136 which is journaled in the plates 134. Connected to one end of the shaft 136 is an arm 138 having a pin and slot connection 139 with one arm of a bell crank 140 pivotally supported at 141 by one of the plates 134. The other arm of the bell crank has a pin and slot connection 142 with the plunger of a solenoid 143 which is operable when energized to effect a swinging of the arm 135 in a clockwise direction to engage the upper feed roll 130 with a card so as to force it against the lower feed roll. Suitable yielding means (not shown) are provided for holding the arm 135 normally in a position with the upper roll 130 spaced from the lower roll. The upper feed roll 131 is loosely mounted upon the shaft 136, and the lower feed roll 131 is fixed to a shaft 145 which is rotatably supported by arms 146 that are fixed to a shaft 147 journaled in the plates 134. A spring 149 is connected between one of the arms 146 and a stationary abutment for holding the lower feed roll 131 in yieldable engagement with the upper feed roll.

The lower feed rolls 130 and 131 are driven continuously by a drive mechanism which includes gears 152 and 153 fixed to the shafts 133, 145 and meshing with an idler gear 154 mounted loosely upon the shaft 147. Attached to one of the plates 134 is a bracket 155 having pillow blocks 156, 157 and 158 (Fig. 1) formed integral with it. A shaft 160 is journaled in the blocks 156, 157 and carries a gear 161 meshing with the gear 152. A bevel gear 162 is connected to the shaft 160 and meshes with a bevel gear 163 connected to a shaft 165 which is journaled in the blocks 157 and 158. As shown in Fig. 1, the shaft 160 extends completely through the block 157, and a collar 166 is connected to its outer end so as to act against the block 157 for limiting longitudinal movement of the shaft due to the thrust of the bevel gears. A flexible coupling member 167 connects the shaft 165 to the shaft 49 for the lower feed roll 45 so that the driving of the feed rolls 130 and 131 is effected by the motor 60.

As a card is advanced through the punching machine it is guided at its forward edge by a member 170 (Fig. 6) which is pivotally supported at 171 by a transverse bar 172 forming part of a card rack that is described in the applications referred to above. When the card is advanced by this rack to its last position in the machine, the forward edge of the card lies between the feed rolls 130 and one end of the pivotally supported member 170 is in a position to be engaged by an arm 174 fixed to the shaft 136. An energizing of the solenoid 143 at this time results in an operation of the bell crank 140 to rock the shaft 136 in a direction to engage the arm 174 with the member 170 for lifting it out of the path of the card. The upper feed roll 130 is lowered at the same time so as to force the card into engagement with the lower feed roll as soon as the member 170 is lifted. The card is then advanced by the feed rolls 130 to the rolls 131 which eject it between the plates 18 and 24 of the card carriage. The edges of these plates adjacent the feed rolls are flared, as shown in Fig. 5, to guide the card, and the edge of the plate 18 remote from the feed rolls is bent upwardly (see Fig. 5) to provide a portion 175 which limits the movement of the card after it is ejected. To prevent a moving of the card carriage toward the feed rolls 45 when the card is not properly positioned upon it, there is provided a light 176 (Figs. 3 and 5) and a photocell 177 supported by the side plate 4 at opposite sides of the carriage 17 adjacent the upwardly bent portion 175. Formed in the carriage is an opening 178 through which light rays may pass from the light to the photocell when the carriage is retracted and there is either no card in the carriage or the card is not properly positioned. When a document is placed in pocket 96 and a card is positioned on carriage 17 to intercept the light rays through the opening 178, the photocell 177 operates, as will be described later, to close contacts in a circuit including the clutch magnet 90.

*Circuit and operation*

As shown in Fig. 8, a switch 180 is adapted to be closed manually for connecting a pair of conductors 181 and 182 to a power line 183, and the motor 60 is connected between these conductors so that it operates continuously for driving the feed rolls 45 and 46 in a direction to advance cards from the card carriage to the stacker box 47. Since the shaft 49 for the lower feed roll 45 is connected through the shaft 165, the bevel gears 162, 163, the shaft 160 and the gear 161 to the gear 152 on the shaft carrying the lower feed roll 130, this feed roll will also be driven continuously, and the lower feed roll 131 is driven at the same time through the idler gear 154 meshing with the gear 152 and the gear 153 on the shaft carrying this roll. The clutch plate 82 is also rotated continuously with the gear 80 which is driven by the gear 81 meshing with the gear 51 on the shaft of the lower feed roll 45.

The card punching machine is provided with a pair of so-called "last column contacts" which are closed when the card is advanced by the rack beyond its last position in the machine. These contacts are shown in Fig. 8 connected in a circuit leading from the conductor 181 through the contacts and a pick-up coil of a relay R1 to the conductor 182. As soon as the last column contacts are closed, the pick-up coil is energized and contacts R1*a* are closed to complete a holding circuit from the conductor 181 through normally closed relay contacts R2*a*, the contacts R1*a* and the holding coil of relay R1 to the conductor 182. The solenoid 143 is connected in parallel with the holding coil of the relay R1 so that it is energized on the closing of the contacts R1*a* to effect a lowering of the upper feed roll 130 for advancing the card to the feed rolls 131. The momentum imparted to the card by the ejector rolls 131 is sufficient to carry the card to the far end of the carriage where it intercepts the light rays through the opening 178.

The light 176 is connected in a circuit 185 between the conductors 181 and 182, and the photocell 177 is connected between the starter anode 186 of a gas tube 187 and a point between two resistors 188 and 189 in a circuit which parallels the gas tube and the pick-up coil of a relay R4. The anode circuit of the gas tube and the pick-up coil of relay R4 are connected in a series circuit 190 extending between the conductors 181, 182 and including normally open relay contacts R3*b* and normally closed relay contacts R2*b*. Connected between the starter anode 186 and a point in the series circuit 190 between the relay R4 and the contacts R3*b* is a resistor 192 of high value as compared to the resistors 188 and 189. When the light rays strike the photocell 177, the resistance of the latter is low and the potential on the starter anode 186 is substantially the same as that at the point between the resistors 188 and 189. This potential is insufficient to effect a firing of the gas tube. When the light rays are cut off, the resistance of the photocell is increased and, provided that the contacts R3*b* are closed, the potential at the starter anode becomes great enough to fire the gas tube and close the circuit 190 for energizing the pick-up coil of relay R4. Relay contacts R4*a* are connected in a circuit including the switch 121 and the clutch magnet 90. These relay contacts are closed when the relay R4 is energized, and the switch 121 is closed after the bar 114 is unlatched by the magnet 117 and is moved forwardly to a position at which the gate 105 is closed. The holding coil of relay 4 is connected in parallel with clutch magnet 90 to insure that relay contacts R4*a* are closed for a long enough time to energize magnet 90.

As mentioned above, the energizing of the magnet 117 for unlatching the bar 114 is dependent upon the interception of the light beam between the light 124 and the photocell 125 by the placing of a document in the pocket 96. The light 124 is connected, as shown in Fig. 8, in a circuit 195 between the conductors 181 and 182, and the photocell 125 is connected between the starter anode 196 of a gas tube 197 and a point between two resistors 198 and 199 in a circuit which parallels the gas tube and a relay R3. The anode circuit of the gas tube and the relay R3 are connected in a series circuit 200 extending between the conductors 181, 182 and including the normally closed contacts R2*b*. A resistor 201 of high value in comparison to the resistors 198 and 199 is connected between the starter anode 196 and a point in the series circuit 200 between the relay R3 and the contacts R2*b*. When the light beam strikes the photocell 125, the resistance of the latter is low and the potential on the starter anode is substantially the same as that at the point between the resistances 198 and 199. This potential is insufficient to effect a firing of the gas tube. When the light beam is cut off, the resistance of the photocell is increased and the potential at the starter anode becomes great enough to fire the gas tube so as to energize the relay R3.

Contacts R3*a* are then closed to complete a circuit from the conductor 181 through the contacts R3*a* and the magnet 117 to the conductor 182. The energizing of the magnet 117 causes the bar 114 to be unlatched so that it moves forwardly to close the gate 105 and to close the contacts of the switch 121 when the gate reaches its closed position. At the same time, contacts R3*b* close to make circuit 190 operative. If a card is in its proper position on the carriage, relay 4 is energized, as already mentioned, and the closing of the contacts R4*a* will complete a circuit from the conductor 181 through the contacts R4*a*, the contacts of the switch 121 and the clutch magnet 90 to the conductor 182. The energizing of the clutch magnet effects an operation of the dog 85 to engage one of the notches 83 in the clutch plate so that the arm 86 is swung with the plate and the gear 80. Since the arm 86 and the cams 27 are both connected to the shaft 28, the cams will be rotated to move the slides 19 forwardly. The card carriage 17 moves with the slides, and the plate 30 with the blade 42 move with the carriage until the abutment members 34 engage the stop bar 35. The front edge of the blade 42 at this time is just short of the feed rolls 45, and the document is only partially folded. The cams 27 continue to rotate and move the carriage forwardly so as to slide the card over the blade 42 until it engages the document and forces it between the feed rolls 45. Movement of the card and the document through the feed rolls 45 and 46 to the stacker box 47 results in a complete folding of the document over the edge of the card.

As the low parts of the cams 27 pass the rollers 26 carried by the slides 19, the card carriage is returned to its home position by the spring 23. The forward movement of the carriage is sufficient to re-engage the shoulder on the bar 114 with the upwardly projecting portion 22 of the carriage plate 18 so that the bar 114 is returned with the carriage to effect an opening of the gate 105 and the contacts of the switch 121.

Connected in parallel with the clutch magnet 90 is a relay R2 which is energized on closing of the contacts of the switch 121 and R4*a* to open the contacts R2*a* and R2*b*. The opening of the contacts R2*a* breaks the holding circuit for the relay R1, and the opening of the contacts R2*b* breaks the circuits through the relay R3 and the pick-up coil of relay R4. The card rack of the punching machine is moved, as described in the applications referred to above, in a direction to effect an opening of the last column contacts after the punched card has been ejected, and these contacts remain open until another punched card is moved to a position for ejection. The breaking of the circuit through the relay R3 results in an opening of the contacts R3*a* to deenergize the magnet 117 so that the bar 114 remains latched to the card carriage after it is returned to its home position. The contacts R3*b* are also opened to prevent energization of the pick-up winding of relay R4 due to an interception of the light to the photocell 177 by the carriage while out of its home position. As the card carriage starts to return, bar 114 permits the contacts of the switch 121 to reopen and to deenergize the holding coil of relay R4. This in turn causes contacts R4*a* to reopen. The breaking of the circuit through the contacts of the switch 121 also results in the deenergization of the magnet 90 for effecting a movement of the latch 88 to a position for engaging the dog 85 and the arm 86 to discontinue the driving of the cams 27 as soon as one revolution has been completed. The opening of the contacts of the switch 121 also breaks the circuit through the relay R2 so that the contacts R2*a* and R2*b* may close. The light rays on the phototubes cause the potentials on the starter anodes to drop to values insufficient to fire the gas tubes when the contacts R2*b* close.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A mechanism for folding a document over the edge of a card comprising, in combination, feed rolls, means for driving said feed rolls, a carriage adapted to support a card, means supporting said carriage for movement so that the card carried thereby travels edgewise in a plane including the points of contact between said feed rolls, a member providing a knife edge in advance of said carriage, means movable with said carriage and providing a sliding support for said member, means yieldingly holding said member for forward movement with said carriage, an abutment engageable by said member for stopping its forward movement just before said knife edge reaches said feed rolls, means for moving said carriage on said supporting means until said member engages said abutment and said card is moved past said knife edge to said feed rolls, and means forming a pocket between said carriage and said feed rolls for supporting a document in a plane substantially normal to the plane in which said carriage is moved, said pocket forming means providing an opening between its ends through which said carriage and said member moves to engage said knife edge with the side of said document for forcing it through said opening to a point adjacent said feed rolls and then to engage the leading edge of the card with said document for forcing it between said feed rolls.

2. A mechanism for folding a document over the edge of a card comprising, in combination, feed rolls, means for driving said feed rolls, a carriage adapted to support a card, means supporting said carriage for movement so that a card carried thereby travels edgewise toward said feed rolls, means for moving said carriage from a home position to advance the card to said feed rolls and then moving the carriage back to its home position, means forming a pocket between said carriage and said feed rolls for supporting a document in a plane substantially normal to the plane in which said carriage is moved, said pocket forming means providing an opening between its ends through which said carriage may move to engage the leading edge of the card with the side of the document and force it between said feed rolls, a gate for closing said pocket, means yieldingly urging said gate toward its closed position, a member connected to said gate and latched to said carriage in its home position for holding said gate open, and means operating on the placing of a document in said pocket for unlatching said member.

3. The mechanism of claim 2 in which said last mentioned means includes an electromagnet which is operable when energized to unlatch said member, a light sensitive cell for controlling the energizing of said electromagnet, and means for directing a light beam through said pocket to said cell at a point which permits interception of the light beam by the document, said cell operating upon interception of the light beam to effect an energizing of said electromagnet.

4. The mechanism of claim 2 in which said last mentioned means includes an electromagnet which is operable when energized to unlatch said member, means for controlling the energizing of said electromagnet including a light sensitive cell, means for directing a light beam through said pocket at a point which permits interception of the light beam by the document, a gas tube, a relay connected in the anode circuit of said gas tube and having normally open contacts connected in a circuit with said electromagnet, means connecting said cell to a starter anode of said gas tube for controlling the potential thereon, said cell operating upon interception of the light beam to increase the potential for firing said gas tube so as to energize said relay and effect a closing of its contacts.

5. The mechanism of claim 2 including a single rotation clutch which is operable when engaged to effect an operation of said carriage moving means to move said carriage from its home position toward said feed rolls and back to its home position, an electromagnet which is operable when energized to effect an engagement of said clutch, and a circuit for energizing said electromagnet, said circuit including contacts adapted to be closed upon the moving of said gate to its closed position.

6. The mechanism of claim 2 in which said carriage includes a portion that is operable upon movement of the carriage toward said feed rolls to relatch said member for effecting an opening of said gate as the carriage is returned to its home position.

7. A mechanism for folding a document over the edge of a card comprising, in combination, feed rolls, means for driving said feed rolls, a carriage adapted to support a card, means supporting said carriage for movement so that a card carried thereby travels edgewise in a plane passing between said feed rolls, means for moving said carriage on said supporting means from a home position to advance the card to said feed rolls and then returning the carriage to its home position, means for supporting a document in a position between said carriage and said feed rolls so that it may be engaged by the leading edge of the card and advanced with the latter to said feed rolls, and means operable automatically on the placing of a card on said carriage and a document on said document supporting means for effecting an operation of said carriage moving means.

8. The mechanism of claim 7 in which said carriage moving means includes a single rotation clutch, a magnet operable when energized to effect an engagement of said clutch, and means responsive to the positioning of a card on said carriage and a document on said document supporting means for effecting an energizing of said magnet.

9. The mechanism of claim 7 in which said carriage moving means includes a single rotation clutch, a magnet operable when energized to effect an engagement of said clutch, a first light sensitive cell, means for directing a beam of light on said first cell along a path which is intercepted by a card properly positioned on said carriage, a second light sensitive cell, means for directing a beam of light on said second cell along a path which is intercepted by a document positioned on said document supporting means, and means operating on the interception of light beams to both of said cells for energizing said magnet.

10. The mechanism of claim 7 including a member having a knife edge, means slidably supporting said member for movement with said carriage, means yieldingly connecting said member to said carriage and normally holding it with the knife edge in advance of the card carried by said carriage, said knife edge engageable with the document for moving the latter toward said feed rolls, and abutment means engageable by said member for limiting its movement to a point just short of said feed rolls.

11. A mechanism for folding a document over the edge of a card comprising, in combination, feed rolls, means for driving said feed rolls, a carriage adapted to support a card, means supporting said carriage for movement so that a card carried thereby travels edgewise in a plane passing between said feed rolls, means for moving said carriage on said supporting means from a home position to advance the card to said feed rolls and then returning the carriage to its home position, a pocket for supporting a document in a position between said carriage and said feed rolls so that it may be engaged by the leading edge of the card and advanced with the latter to said feed rolls, a gate movable to a position for covering said pocket, means yieldingly urging said gate toward its pocket covering position, a member connected to said gate and latched to said carriage in its home position for holding said gate open, means operating on the placing of a document in said pocket for unlatching said member, and means operating on the placing of a document in said pocket and the positioning of a card on said carriage for effecting operation of said carriage moving means.

12. The mechanism of claim 10 including a single rotation clutch which is operable when engaged to effect an operation of said carriage moving means, an electromagnet operable when energized to effect an engagement of said clutch, a circuit for energizing said electromagnet, said circuit including a pair of contacts of a relay and another pair of contacts adapted to be closed by said gate upon movement to its pocket covering position, and means responsive to the positioning of a card on said carriage for controlling the energizing of said relay.

13. A mechanism adapted to receive a card from a card punching machine and to fold a document over one edge of the card comprising, in combination, a card carriage, means supporting said carriage for movement in a path extending transversely of the punching machine, means including a single rotation clutch for moving said carriage from a home position on said supporting means, means for ejecting a card from the punching machine to said carriage when the latter is in its home position, a pair of feed rolls arranged to receive a card from said carriage when the latter is moved from its home position, means for driving said feed rolls, means for supporting a document in a position to be engaged by the leading edge of a card and moved therewith to said feed rolls on movement of said carriage from its home position, and means operable automatically on the positioning of a card on said carriage and the placing of a document on said document supporting means for engaging said clutch.

14. The mechanism of claim 13 including means for partially folding the document before engagement of the card therewith, said last mentioned means including a member engageable with the document in advance of said card, means yieldingly connecting said member to said carriage for movement therewith, and abutment means engageable by said member for limiting its movement while said carriage continues to move toward said feed rolls.

15. A mechanism for folding a document over the edge of a card comprising, in combination, feed rolls, means for driving said feed rolls, means for advancing a card edgewise to said feed rolls, said card advancing means comprising a carriage having parallel plates spaced from each other a distance slightly greater than the thickness of a card and between which the card may be arranged with its leading edge extending beyond said plates, said plates operating to hold said card loosely in place as it is moved toward said feed rolls and to prevent a buckling of the card on engagement with a document, means supporting said carriage for movement in a plane including the points of contact between said feed rolls, means for moving said carriage on said supporting means, and means adapted to support a document between said card advancing means and said feed roll so that it is engaged at one side by the leading edge of the card and moved with the latter between said feed rolls.

GUSTAV V. A. MALMROS.
EDMUND A. BARBER, Jr.

REFERENCES CITED

The following references are of record in the file of this patent:

UNITED STATES PATENTS

| Number | Name | Date |
|---|---|---|
| 148,743 | Packer | Mar. 17, 1874 |
| 936,480 | Sague | Oct. 12, 1909 |
| 2,482,059 | Gates et al. | Sept. 13, 1949 |
| 2,482,060 | Gates et al. | Sept. 13, 1949 |